US012757824B2

(12) United States Patent
Rossato

(10) Patent No.: US 12,757,824 B2
(45) Date of Patent: Oct. 13, 2026

(54) ROTARY SCREEN FOR A COMBINE HARVESTER

(71) Applicant: AGCO International GmbH, Neuhausen (CH)

(72) Inventor: Federico Rossato, Breganze (IT)

(73) Assignee: AGCO International GmbH, Neuhausen (CH)

( * ) Notice: Subject to any disclaimer, the term of this patent is extended or adjusted under 35 U.S.C. 154(b) by 260 days.

(21) Appl. No.: 18/767,514

(22) Filed: Jul. 9, 2024

(65) Prior Publication Data

US 2025/0072323 A1 Mar. 6, 2025

(30) Foreign Application Priority Data

Aug. 28, 2023 (GB) .................................... 2313046
Sep. 1, 2023 (EP) .................................... 23425044

(51) Int. Cl.
*A01D 41/12* (2006.01)

(52) U.S. Cl.
CPC ................................ *A01D 41/1252* (2013.01)

(58) Field of Classification Search
CPC .................................................. A01D 41/1252
See application file for complete search history.

(56) References Cited

U.S. PATENT DOCUMENTS 3,002,585 A * 10/1961 Pasturczak ............. B01D 46/26 415/121.2
3,475,883 A * 11/1969 Sullivan ................... F01P 11/12 55/290
3,816,981 A * 6/1974 Carnewal ............... B01D 45/14 55/467
3,837,149 A 9/1974 West et al.
4,233,040 A * 11/1980 Vogelaar ................ B01D 46/26 55/467
4,299,603 A * 11/1981 Friesen .................. B60K 11/04 55/408
4,971,026 A * 11/1990 Fineblum ............... B01D 46/70 126/110 R (Continued)

FOREIGN PATENT DOCUMENTS

EP 1880752 A1 * 1/2008 ......... B01D 46/0056
GB 511455 A 8/1939

(Continued)

OTHER PUBLICATIONS

UK Intellectual Property Office, Search Report for related UK Application No. GB2313046.1, dated Feb. 8, 2024, 3 pages.

*Primary Examiner* — Claude J Brown

(57) ABSTRACT

A rotary screen is provided for cleaning an air flow for use by a combine harvester, for example for use by a cooling system. An annular brush is used to provide a seal between a rotating screen member and a static plate. The brush extends generally radially outwardly from a support towards the rotary screen member, which is fitted around the brush so that a radially outer surface of the brush contacts an inner surface of a seal region of the rotary screen member. The seal region tapers radially outwardly towards its axial end and also overlaps the brush. In this way, the brush is protected from damage and also has a long lifetime because it still performs its sealing function even after experiencing wear.

8 Claims, 7 Drawing Sheets

(56) References Cited

U.S. PATENT DOCUMENTS

| | | | | | |
|---|---|---|---|---|---|
| 5,285,751 | A * | 2/1994 | Liegeois | F01P 11/12 55/400 |
| 5,944,603 | A | 8/1999 | Guinn et al. | |
| 6,029,430 | A * | 2/2000 | Isfort | A01F 12/54 56/13.3 |
| 6,193,772 | B1 * | 2/2001 | Wiefel | F01P 11/12 55/467 |
| 6,298,819 | B1 * | 10/2001 | Johnson | F01P 11/12 55/408 |
| 6,514,303 | B2 * | 2/2003 | Lukac | G01B 5/255 180/84 |
| 7,875,093 | B1 * | 1/2011 | Hershbarger | B01D 46/10 55/482 |
| 7,998,245 | B2 * | 8/2011 | Demonie | B01D 46/26 460/98 |
| 8,876,927 | B2 * | 11/2014 | Hollatz | B60K 11/04 460/98 |
| 10,371,106 | B2 * | 8/2019 | Underhill | B01D 46/70 |
| 2002/0088208 | A1 * | 7/2002 | Lukac | A01B 51/026 55/385.3 |
| 2004/0003578 | A1 * | 1/2004 | Twiefel | A01D 41/1252 55/385.3 |
| 2008/0256915 | A1 * | 10/2008 | D'hondt | A01D 75/18 55/288 |
| 2008/0261507 | A1 | 10/2008 | D'hondt | |
| 2009/0312079 | A1 * | 12/2009 | Good | B01D 46/0056 460/119 |
| 2010/0006361 | A1 * | 1/2010 | Vandike | F04D 25/166 415/58.4 |

FOREIGN PATENT DOCUMENTS

| | | | |
|---|---|---|---|
| GB | 1136600 | A | 12/1968 |
| JP | H099760 | A | 1/1997 |
| JP | 2000272357 | A | 10/2000 |

* cited by examiner

ROTARY SCREEN FOR A COMBINE HARVESTER

CROSS-REFERENCE TO RELATED APPLICATION

This application claims the benefit of the filing date of United Kingdom Patent Application 2313046.1, "A Rotary Screen for a Combine Harvester," filed Aug. 28, 2023; and European Patent Application 23425044.7, "A Rotary Screen for a Combine Harvester," filed Sep. 1, 2023; the entire disclosure of each of which is incorporated herein by reference.

FIELD

Embodiments of the present disclosure relate generally to combine harvesters, and in particular to a rotary screen used within a combine harvester.

BACKGROUND

A combine harvester typically includes a threshing system for detaching grains of cereal from material other than grain, such as cobs, stems and seed pods, a separating apparatus downstream of the threshing system, and a grain cleaning apparatus (known as the cleaning shoe) for receiving grain from the separating apparatus. A stratification pan aims to stratify the material into a layered structure of grain at the bottom and light chaff and other material other than grain (MOG) at the top. The grain is collected in a grain bin, and from the grain bin the grain can be unloaded, for example to a trailer pulled by a tractor which runs alongside the combine harvester.

Combine harvesters typically have water-cooled engines, having a water radiator which cooled by a flow of air. It is known to use a belt-driven or hydraulically-driven rotary screen to filter chaff and other debris from the cooling air flow, allowing a cleaner air flow through the radiator cooling system. Debris in the air flow will clog the cooling channels of the radiator, and hence reduce the cooling efficiency. The rotary screen prevents debris reaching the cooling system, and thereby reduces the time needed to clean and maintain the radiator cooling system. Such a rotary screen may also be used to provide clean air for cooling a turbo compressor or providing clean air to the turbo compressor, for cooling hydrostatic oil, or even engine oil or fuel.

The rotary screen comprises a rotating filter mesh through which an air flow is drawn and delivered downstream, for example to the radiator cooling system, via a stationary outlet plate. A problem arises that if there is an imperfect seal between the rotating part and the stationary part, debris can still enter the cleaned air flow.

It is known to use a brush to function as a seal between the rotating screen and the stationary plate. However, the brush can be damaged by larger debris, and it also suffers from wear over time.

There is therefore a need for an improved rotating screen design.

BRIEF SUMMARY

In some embodiments, a rotary screen for cleaning an air flow for use by a combine harvester includes a fixed plate having an opening for delivering filtered air; an annular brush support mounted to the fixed plate; an annular brush extending generally radially outwardly from the brush support; and a rotary screen member which is rotatable relative to the fixed plate and fitted around the brush. An axial end region of the rotary screen adjacent the fixed plate comprises a seal region, and a radially outer surface of the brush contacts an inner surface of the seal region to form a seal. The seal region tapers radially outwardly towards its axial end, and the seal region overlaps the brush such that the axial end is closer to the fixed plate than the brush.

This rotary screen uses a brush to provide a seal between the rotating screen member and the fixed plate (though which the cleaned air is delivered). The brush is located radially inside the rotary screen member so that it is less exposed to large debris, and hence less prone to damage. The rotary screen member functions as a shield to protect the brush. In addition, the brush engages with a sloped surface. This means that a brush seal can be made with different lengths of brush tufts. When the brush is new, it has relatively long tufts so they reach to near the axial end of the seal region. However, when they wear over time, a seal is still made because the now shorter tufts still reach to a nearer region of the sloped seal region. The flow conditions for example urge the brush tufts towards the radially narrower end of the seal region, so that the brush tufts automatically position at which a seal is formed with the seal region.

It is noted that the seal created by the brush does not need to be an air tight seal. Instead, it may be considered to comprise a filtering seal, in that the brush tufts perform a filtering function rather than a full blocking function. Thus, the term "seal" in this context should be understood accordingly.

The seal region for example has an angle of taper, relative to the axial direction, of between 10 degrees and 80 degrees. The angle of taper may be between 30 degrees and 60 degrees such as 45 degrees. A flatter angle allows a better seal to be formed (since the contact is made to the bristle tips). A steeper angle however enables the seal to be maintained over a greater amount of wear but may be a less effective seal. Thus, the angle of taper is chosen to provide a compromise between these factors.

The brush for example comprises bristles which extend in a radial direction from the brush support, when in a rest state. However, the bristles are deformed away from this rest state by the presence of the seal region. The bristles for example have a length (i.e., the initial length at manufacture) which is greater than the radial distance from the brush support to the seal region. Thus, the bristles are deformed in an axial direction to contact with a radially wider location of the seal region.

In one example, the rotary screen member comprises a cylindrical orifice sheet. However, in another example, the rotary screen member comprises a generally orifice cylindrical sheet with a corrugated surface. This corrugated surface increases the surface area and hence allows a greater air flow rate, which improves the cooling performance. The rotary screen can alternatively be smaller and lower cost to achieve the same performance.

In other embodiments, a combine harvester includes a crop cutting head, a threshing and separating system, a water-cooled engine, a radiator, and a rotary screen for filtering air to be provided to the radiator as cooling air.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

Figure 1:
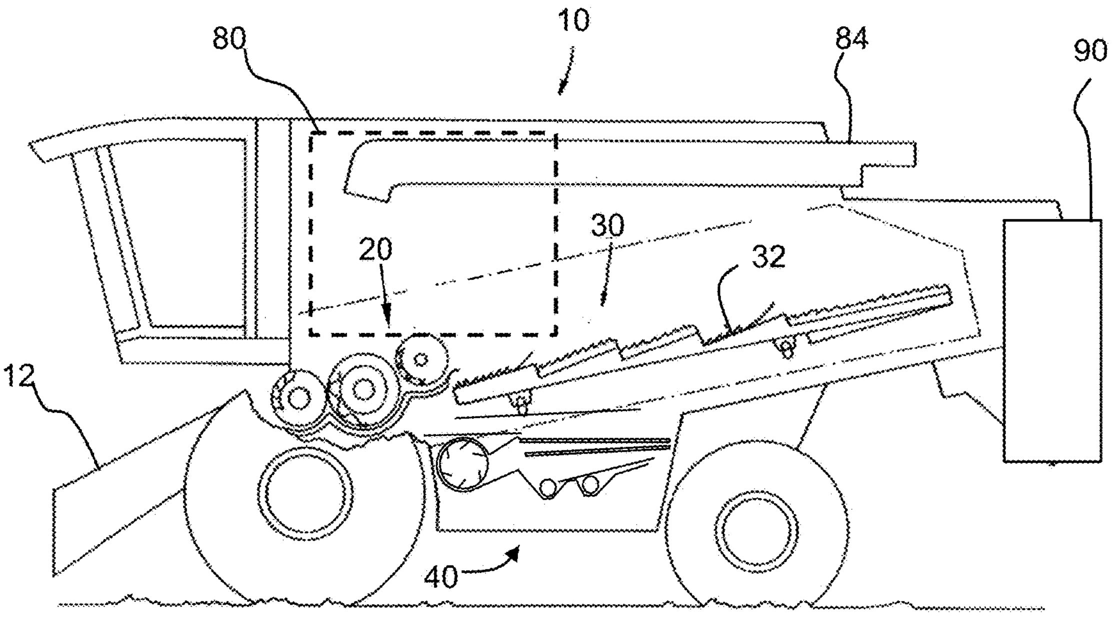
FIG. 1 shows a combine harvester.

The illustrations presented herein are not actual views of any combine harvester or portion thereof, but are merely idealized representations to describe example embodiments of the present disclosure. Additionally, elements common between figures may retain the same numerical designation.

It should be understood that the detailed description and specific examples, while indicating exemplary embodiments of the apparatus, systems and methods, are intended for purposes of illustration only and are not intended to limit the scope of the disclosure. These and other features, aspects, and advantages of the apparatus, systems and methods of the present disclosure will become better understood from the following description, appended claims, and accompanying drawings. It should be understood that the figures are merely schematic and are not drawn to scale. It should also be understood that the same reference numerals are used throughout the figures to indicate the same or similar parts.

This disclosure provides a rotary screen for cleaning an air flow for use by a combine harvester. An annular brush is used to provide a seal between a rotating screen member and a static plate. The brush extends generally radially outwardly from a support towards the rotary screen member, which is fitted around the brush. Thus, a radially outer surface of the brush contacts an inner surface of a seal region of the rotary screen member. The seal region tapers radially outwardly towards its axial end and also overlaps the brush. In this way, the brush is protected from damage and also has a long lifetime because it still performs its sealing function even after experiencing wear.

This disclosure relates to the design of a rotary screen for filtering the air used for cooling purposes, for example to cool the water-cooled engine of a combine harvester, or for delivering filtered air for other purposes such as the air intake of a turbo compressor. It may also be used for cooling other fluids such as transmission fluid or engine oil. Before the rotary screen is described, a general outline of a combine harvester will first be provided.

FIG. 1 shows a known combine harvester 10 to which this disclosure may be applied. The combine harvester includes a threshing system 20 for detaching grains of cereal from the ears of cereal, and a separating apparatus 30 which is connected downstream of the threshing system 20. The threshing system comprises one or more threshing units, in particular rotors, and associated concaves. In the example shown, the separating apparatus 30 includes a plurality of parallel, longitudinally-aligned, straw walkers 32, and this is suitable for the case of a so-called straw-walker combine. The grains after separation by the separating device 30 pass to a grain cleaning apparatus 40.

The grain cleaned by the grain cleaning apparatus is delivered to a grain bin 80 by a filling auger 70. Grain from the grain bin is removed from the combine harvester by an unloading tube 84.

The combine harvester has a front elevator housing 12 at the front of the machine for attachment of a crop cutting head (known as the header). The header when attached serves to cut and collect the crop material as it progresses across the field, the collected crop stream being conveyed up through the elevator housing 12 into the threshing system 20.

In the example shown, the threshing system 20 is a tangential-flow 'conventional' threshing system, i.e., formed by rotating elements with an axis of rotation in the side-to-side direction of the combine harvester and for generating a tangential flow. For example, the 'conventional' threshing system includes a rotating, tangential-flow, threshing cylinder and a concave-shaped grate. The threshing cylinder includes rasp bars which act upon the crop stream to thresh the grain or seeds from the remaining material, the majority of the threshed grain passing through the underlying grate and onto a stratification pan (also sometimes known as the grain pan).

There are also axial threshing systems, i.e., formed by rotating elements with an axis of rotation in the longitudinal direction (direction of travel). For example, the threshing section may have axially-aligned rasp bars spaced around the front section, and the separating section has separating elements or fingers arranged in a pattern, e.g., a spiral pattern, extending from the rasp bars to the rear of the rotor.

The MOG (material other than grain), in particular chaff, exits the combine harvester at the back. This disclosure relates to a chaff spreader 90 provided at the back of the combine harvester. As discussed above the chaff spreader may be used for spreading the chaff in a uniform layer over the harvested field, or it may be used to mix the chaff with straw, either for distribution or for mixing with a straw swath.

As mentioned above, instead of tangential flow threshing (and separating), axial threshing (and separating) is also known, and the disclosure may be applied to any type of combine.

The combine harvester has a water-cooled engine, with a radiator to provide cooling. An air flow is delivered to the radiator to provide the cooling function. However, the air surrounding a combine harvester in use has a large amount of debris (chaff etc.), and this debris can clog up the radiator channels and thus impact the cooling function.

It is well known to use a rotary screen to perform filtering of the air before delivery to the radiator for cooling.

Figure 2:
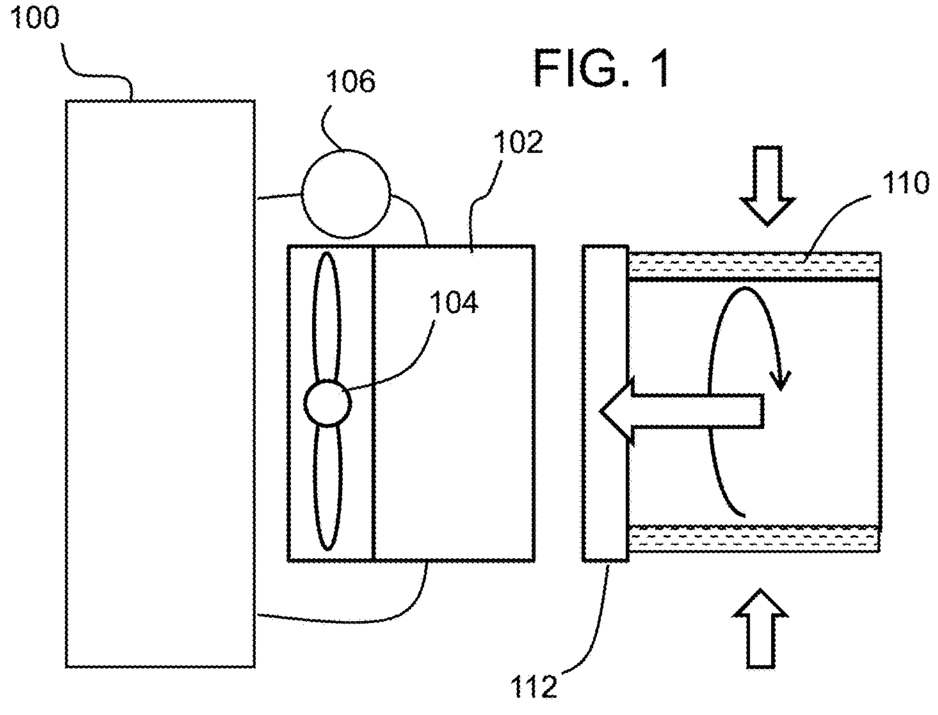
FIG. 2 shows a typical configuration of a cooling system of a combine harvester.

FIG. 2 shows a typical configuration of a cooling system of a combine harvester. The combine harvester has an engine 100, radiator 102 and fan 104 for drawing air through the radiator. Water is pumped between the radiator 102 and the engine by pump 106. To provide a clean air flow to the radiator, a rotary screen is provided. The rotary screen comprises a rotating screen member 112 which is fixed to rotate relative to a fixed plate 114. A stationary blocking member internally of the screen functions to block the air passageway through a local portion of screen currently positioned at that location, so that debris that has collected on the outside of the screen can be released, to keep the rotary screen member clear. The air flow through the rotary screen is driven by the fan 104.

This disclosure relates to the design of the rotary screen, and in particular it relates to the sealing between the rotary screen member 112 and the fixed plate 114. Debris can pass through if there is not a sufficient seal, hence reducing the effectiveness of the rotary screen.

Figure 3:
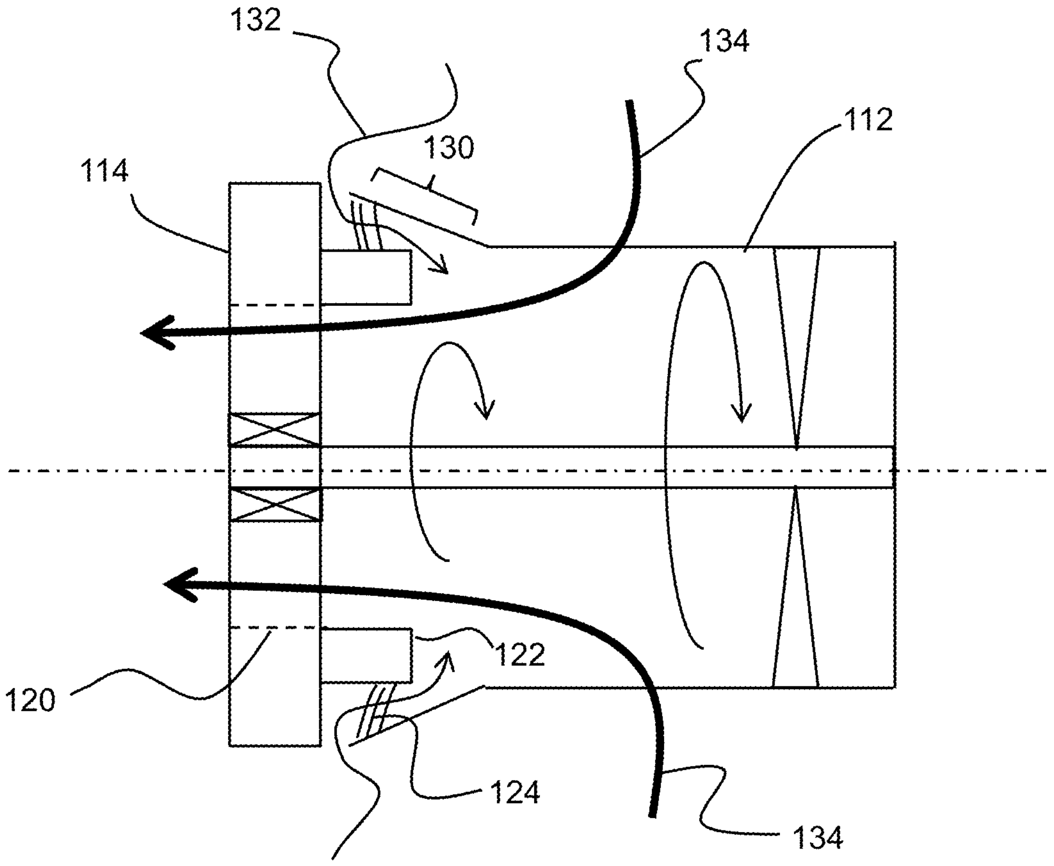
FIG. 3 shows an example of rotary screen.

FIG. 3 shows an example of rotary screen in accordance with this disclosure.

As in the known design, it comprises a fixed plate 114 and a rotary screen member 112.

The fixed plate 114 has an opening 120 for delivering filtered air. An annular brush support 122 extends axially from the fixed plate (wherein "axially" refers to the axis of rotation of the screen member). An annular brush 124 extends generally radially outwardly from the brush support 122.

The rotary screen member 112 is rotatable relative to the fixed plate and fitted around the brush. An axial end region 130 of the rotary screen member adjacent the fixed plate 114 comprises a seal region, and a radially outer surface of the brush 124 contacts an inner surface of the seal region 130 to form a seal. This seal does not need to block all flow—instead, it may perform a filtering function but still allow a flow as shown by arrow 132. Thus, the "seal" is for providing a barrier to the flow of debris such as chaff, for example as a filtering function. The main flow is shown by arrows 134. The rotary screen is for example driven by a belt, which is driven by a pulley system coupled to a rotary output from the engine. The belt engages with a portion of the periphery of the rotary screen so that rotation of the belt around its pulley system entrains rotation of the rotary screen.

The seal region tapers radially outwardly towards its axial end (so that the rotary screen member has an increased diameter at its open end adjacent the fixed plate 114 compared to the main body of the rotary screen member). The purpose of this slope is to enable the design to tolerate wear of the brush. In particular, in a non-worn state of the brush, the brush bristles will have an initial maximum length. They will thus reach to, and seal with, a radially outermost part of the seal region. As the bristles wear down, they will reach to, and seal with, a radially nearer part of the seal region. The bristles are biased toward the radially innermost part of the seal region, by the flow that exists through the rotary screen, in particular an under-pressure within the rotary screen member. The bristles may also have an elastic bias in the same direction, namely a bias in a direction matching the flow direction 132.

The seal region 130 overlaps the brush such that the axial end is closer to the fixed plate than the brush. In this way, the seal region acts as a protective shield to prevent large debris damaging the brush.

The seal region 130 for example has an angle of taper, relative to the axial direction, of between 10 degrees and 80 degrees. The angle of taper may be between 30 degrees and 60 degrees such as 45 degrees. A steeper angle gives a greater range of bristle length that can still maintain a seal, but may give reduced sealing performance.

The brush bristles for example bend to make contact with the seal region. In a rest state with no seal region present, the bristles extend further radially than the maximum distance that will be present to the seal region. Thus, the bristles are deformed in the axial direction to make contact with a portion of the seal region at the correct distance to correspond to the bristle length at any particular point in time.

Figure 4:
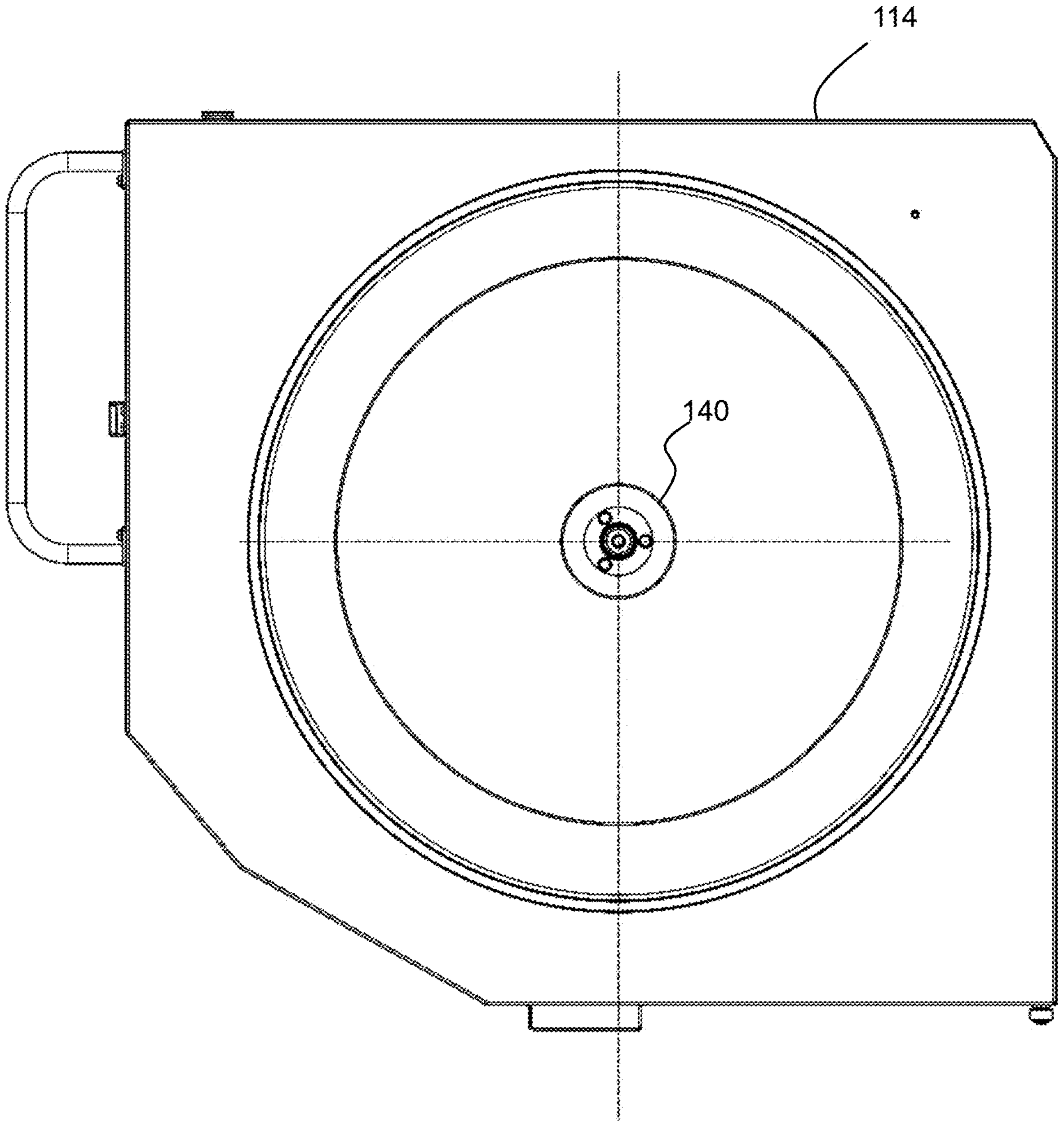
FIG. 4 shows a fixed plate.

FIG. 4 shows the fixed plate. A drive shaft bearing 140 is shown at the center.

Figure 5:
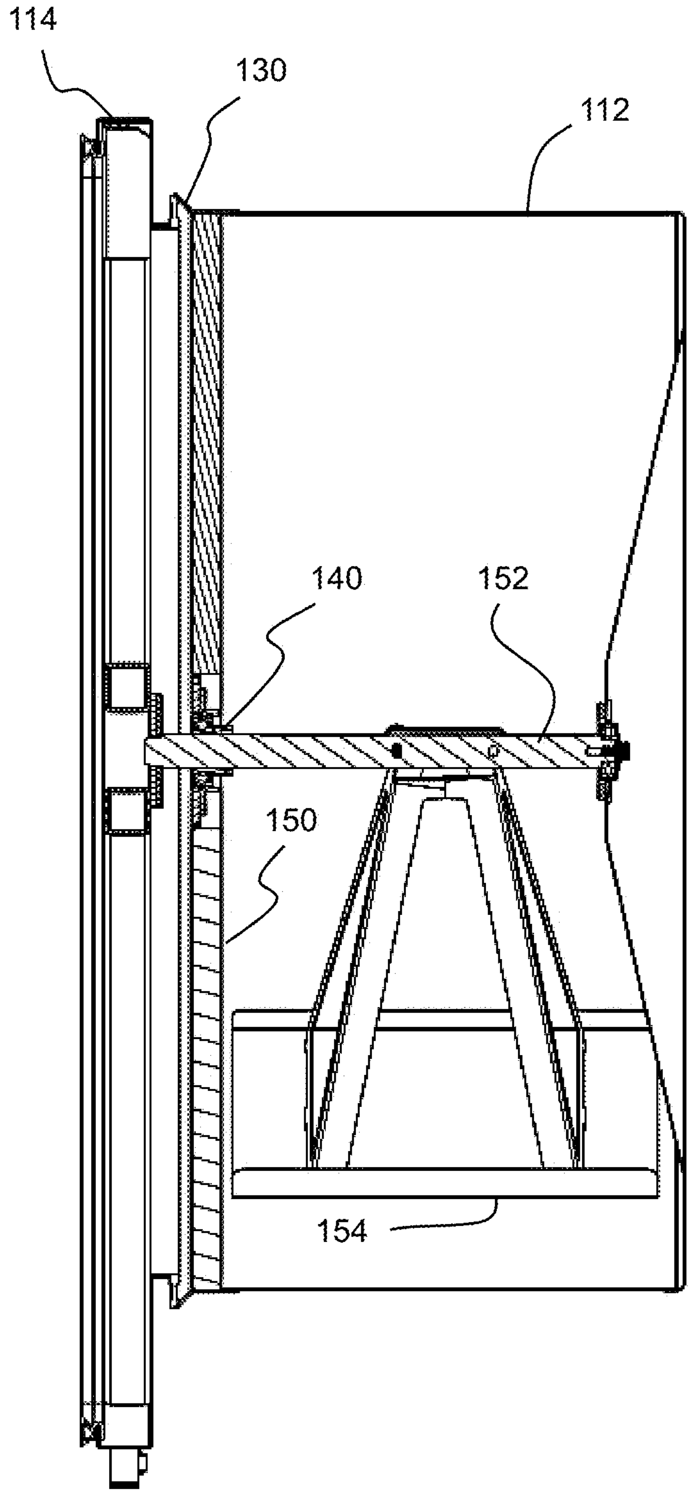
FIG. 5 shows a complete rotary screen.

FIG. 5 shows the complete rotary screen. It shows the rotary screen member 112 supported by spokes 150 around a shaft 152. It also shows the static blocking member 154 used to prevent clogging of the rotary screen member.

Figure 6:
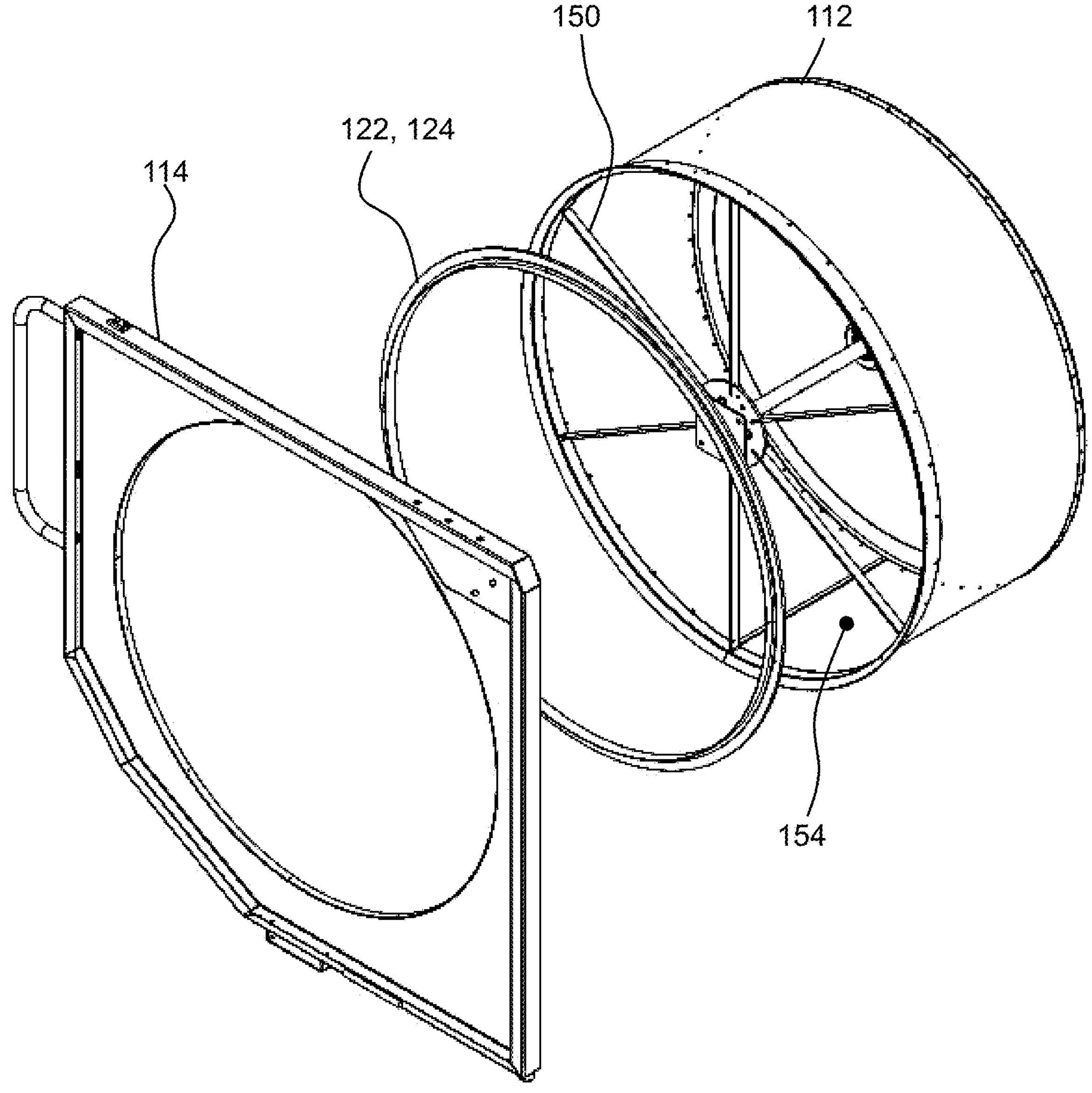
FIG. 6 shows the rotary screen in exploded perspective view.

FIG. 6 shows the rotary screen in exploded perspective view. It shows the fixed plate 114 and the rotary screen member 112, and also shows the annular brush 124 and its support 122 as a separate part which is fixed between the rotary screen member 112 and the fixed plate 114.

Figure 7:
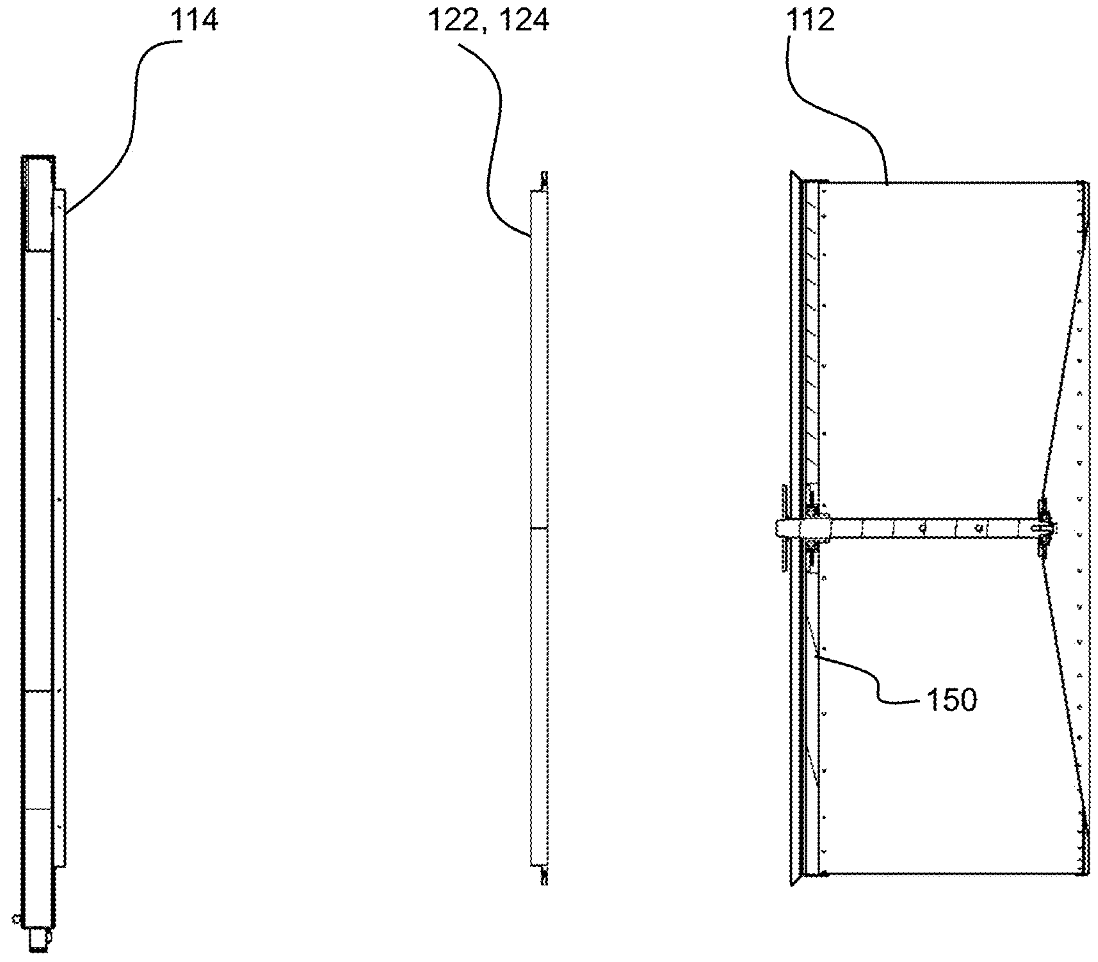
FIG. 7 shows the rotary screen in exploded side view.

FIG. 7 shows the rotary screen in exploded side view.

Figure 8:
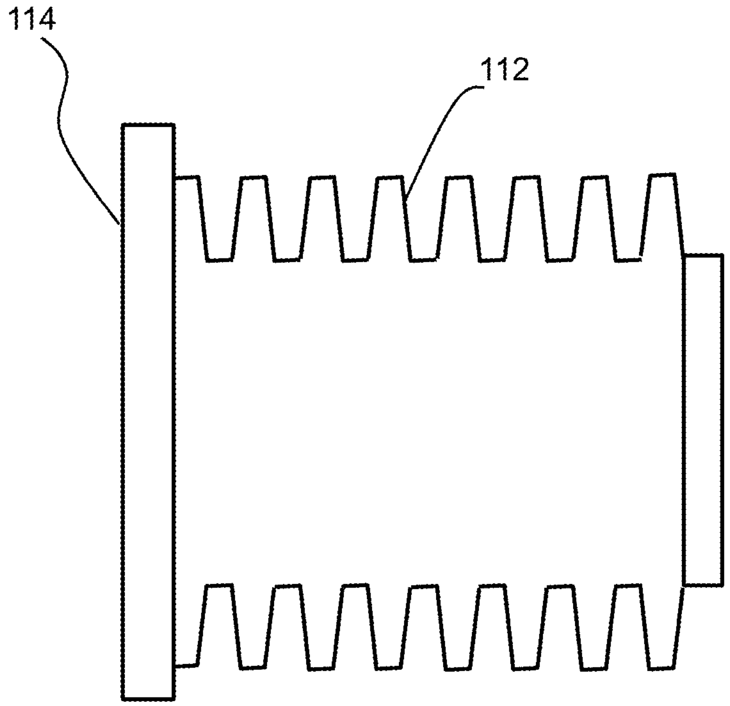
FIG. 8 shows a rotary screen member with a corrugated form.

In the example above, the rotary screen member 112 is shown as a cylindrical perforated sheet (cylindrical up to the seal region). The cylindrical region may have a corrugated i.e., undulating, surface as shown in FIG. 8. This increases the surface area and thus enables an increased flow rate for a given size of rotary screen. The rotary screen member then comprises a generally cylindrical sheet with a corrugated surface.

The disclosure may be applied to any design of combine harvester. Thus, it does not rely on any particular threshing, separating or cleaning design, and the examples above are only given to aid overall understanding. As explained above, the disclosure may be used for providing a clean air flow from the air around a combine harvester, for any use by the combine harvester, including any cooling function or any other need for a clean air flow.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

Variations to the disclosed embodiments can be understood and effected by those skilled in the art, from a study of the drawings, the disclosure, and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

Any reference signs in the claims should not be construed as limiting the scope.

All references cited herein are incorporated herein in their entireties. If there is a conflict between definitions herein and in an incorporated reference, the definition herein shall control.

What is claimed is:

1. A rotary screen for cleaning an air flow for use by a combine harvester, comprising:

- a fixed plate having an opening for delivering filtered air;
- an annular brush support mounted to the fixed plate;
- an annular brush extending generally radially outwardly from the brush support; and
- a rotary screen member which is rotatable relative to the fixed plate and fitted around the brush, wherein an axial end region of the rotary screen member adjacent the fixed plate comprises a seal region, wherein a radially outer surface of the brush contacts an inner surface of the seal region to form a seal;

wherein the seal region tapers radially outwardly towards the axial end region of the rotary screen member, and wherein the seal region overlaps the brush such that the axial end region is closer to the fixed plate than the brush is.

2. The rotary screen of claim 1, wherein the seal region has an angle of taper between 10 degrees and 80 degrees relative to an axis of rotation of the rotary screen member.

3. The rotary screen of claim 2, wherein the seal region has an angle of taper between 30 degrees and 60 degrees relative to the axial direction.

4. The rotary screen of claim 1, wherein the brush comprises bristles that extend in a radial direction from the brush support when in a rest state.

5. The rotary screen of claim 4, wherein the bristles have a length greater than a radial distance from the brush support to the seal region.

6. The rotary screen of claim 1, wherein the rotary screen member comprises a cylindrical orifice sheet.

7. The rotary screen of claim 1, wherein the rotary screen member comprises a generally cylindrical sheet with a corrugated surface.

8. A combine harvester comprising:

a crop cutting head;

a threshing and separating system;

a water-cooled engine;

a radiator; and the rotary screen of claim 1 for filtering air to be provided to the radiator as cooling air.

* * * * *